United States Patent [19]

Akiyama

[11] 4,207,704
[45] Jun. 17, 1980

[54] MOVABLE SOUND PRODUCING MODEL

[75] Inventor: Mineo Akiyama, Tokyo, Japan

[73] Assignee: Tokyo Design Kogei Co., Ltd., Tokyo, Japan

[21] Appl. No.: 815,247

[22] Filed: Jul. 13, 1977

[30] Foreign Application Priority Data

Oct. 18, 1976 [JP] Japan .................................. 51-123792

[51] Int. Cl.² ............................................ A63H 33/26
[52] U.S. Cl. ........................................ 46/232; 46/171; 40/457; 360/79
[58] Field of Search .................. 46/232, 175 AR, 227, 46/252, 256, 117, 171; 360/79; 40/457

[56] References Cited

U.S. PATENT DOCUMENTS

| 2,250,916 | 7/1941 | Magruder | 46/232 X |
|---|---|---|---|
| 2,867,049 | 1/1959 | Brackensey | 40/457 |
| 2,890,535 | 6/1959 | Kenworthy | 40/457 |
| 3,131,497 | 5/1964 | Rogers | 40/457 |
| 3,246,409 | 4/1966 | Taylor et al. | 40/457 |
| 3,287,849 | 11/1966 | Weiss | 46/232 |
| 3,685,200 | 8/1972 | Noll | 46/232 |
| 3,696,358 | 10/1972 | Vasku | 40/457 X |
| 3,840,086 | 10/1974 | Burton | 46/252 X |
| 3,912,694 | 10/1975 | Chiappe et al. | 46/232 X |
| 3,919,915 | 11/1975 | Isbell | 360/79 X |

FOREIGN PATENT DOCUMENTS

| 279241 | 12/1965 | Australia | 46/232 |
|---|---|---|---|
| 738669 | 7/1966 | Canada | 46/232 |
| 1901187 | 8/1969 | Fed. Rep. of Germany | 46/232 |

Primary Examiner—Louis G. Mancene
Assistant Examiner—Mickey Yu

[57] ABSTRACT

A movable model of an animal is described in which a driving mechanism adapted to operate synchronously with generation of a sound by a control circuit is incorporated in a simulated animal-like body portion formed of a soft foamed urethane block which has been shaped to the external configuration of a human or animal, and an operating end of said driving mechanism is joined to a part of said soft foamed urethane block forming the body portion of the model so as to induce movement of the moving parts of said body portion.

6 Claims, 35 Drawing Figures

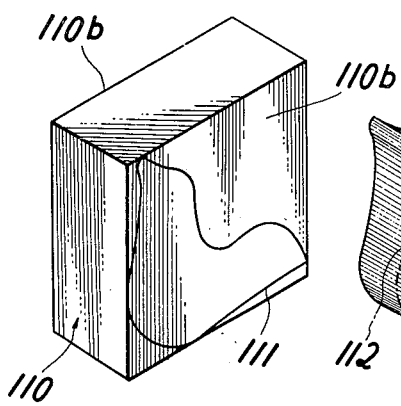
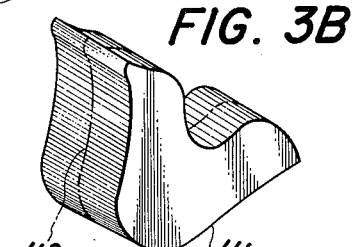
FIG. 3A    FIG. 3B
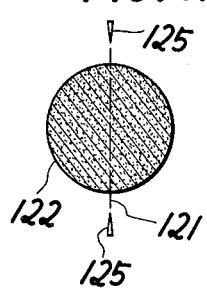
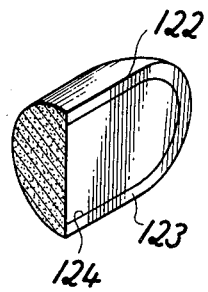
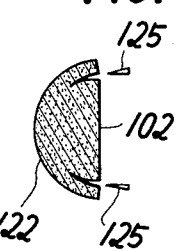
FIG. 4A    FIG. 4B    FIG. 4C
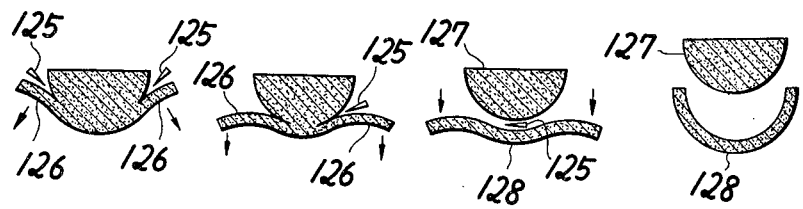
FIG. 4D    FIG. 4E    FIG. 4F    FIG. 4G

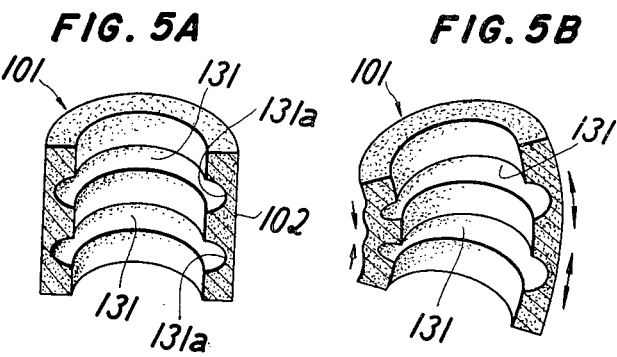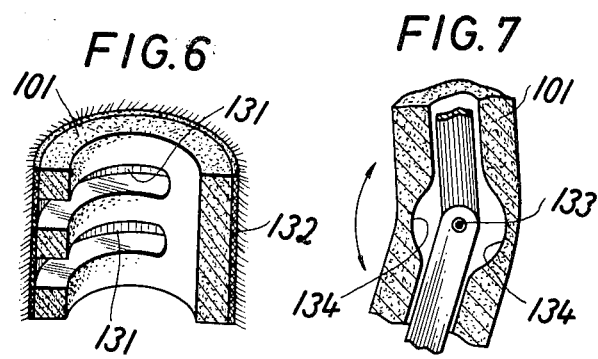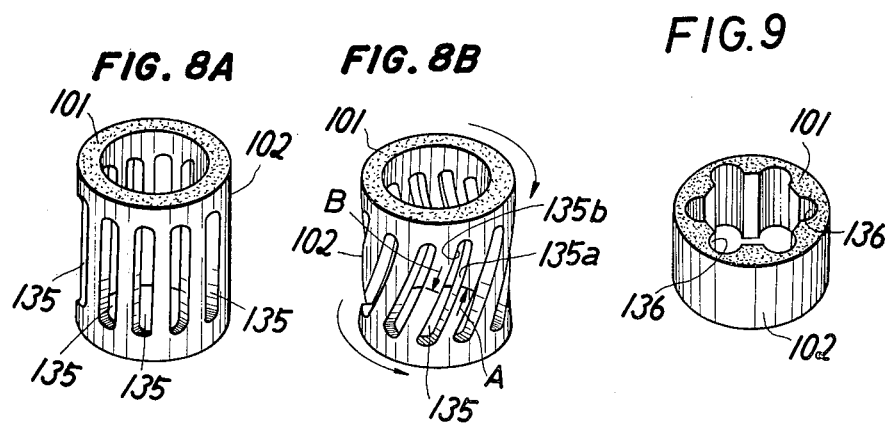

MOVABLE SOUND PRODUCING MODEL

BACKGROUND OF THE INVENTION

1. Field of the Invention

This invention relates to a movable model of an animal, or the like, which mimics the motions and sounds of the animal and can be conveniently used for display or for other purposes.

More particularly, this invention relates to a mechanism of a movable model of an animal, doll, etc., using electric power, air pressure, hydraulic force as the source of motive force, whereby there is created a movement strikingly similar to the actual movement of an animal, human, etc., not only during the operation of the mechanism but also before and after the operation, and the generation of a sound such as a cry or talking voice synchronized with the movement of the model.

2. Description of the Prior Art

It is known in the art to form models of animals, which are stuffed or produced from clay plastics or the like. However, these models are generally static reproductions. The dynamic models known in the art are limited to the small sized ones, such as toys for children, and there are available few full-sized models which make movements similar to those of the living couterparts.

This is largely attributable to the fact that it is technically different to make a full-sized model having an external appearance resembling that of a real animal, with material which have been used heretofore; and that such reproduction is not economical in most cases. Nonetheless, there is today an increasing demand for full-sized dynamic models for window dressing in department stores or for displays at station squares, parks and the like.

Generally, for making an animal model by using a soft and flexible material, there is employed a method in which a skelton is first formed and the forming material is applied thereto to shape the model. For making a full-sized animal, the skin portion alone is first sewn up and then a soft material is stuffed therein. In the case of a toy, a cavity is formed from a prototype made of clay or such and then a molding material is cast thereinto. It is thereby possible to make a soft model, but this method, when used for making a full-sized model, is disadvantageous economically.

Many attempts have been made heretofor to produce model animals and the like for mobile display purposes by use of electric power or pneumatic force for amusement or advertising purposes.

However, in such conventional moving models, preference has been given to the contrivances for approximating their movements to those of the living counterparts, and little consideration has been paid to vocalization of such models.

Although there has been devices of late providing various sound-producing mechanisms for incorporation in model animals, the voice or sound produced is, in most cases, far from approaching the fidelity of the sounds emitted by the animals, and also such sounds are not synchronized with the movement of the animals.

SUMMARY OF THE INVENTION

The model mechanism according to this invention comprises a body portion made from a soft block, preferably of foamed urethane, which is externally shaped to the form of an animal, and, which has formed therein a housing for driving means, a control circuit for detecting the audio signal from a sound source at a predetermined level and operating the driving means synchronously with generation of sound, and a driving unit set in said housing in said body portion, with an operating end of the driving member for inducing movement of the moving parts which are joined to a part of the soft foamed urethane resin block forming said body portion.

The general object of this invention is to provide a model which is capable of creating the illusion of a life-sized animal.

Another object of this invention is to provide a moving model having an external appearance closely akin to that of a real animal, etc., in both stationary and moving postures.

Still another object of this invention is to provide an able model in which the movement of the body portion is quite natural.

Still another object of this invention is to provide a model which is easy to assemble and disassemble and also easy to handle and can be conveniently transported.

Yet another object of this invention is to provide a model which is resistant to damage by impact or other external forces.

A further object of this invention is to provide a life-sized movable model.

It is also an object of this invention to provide a model which is capable of producing a sound synchronously with its movement.

It is still another object of this invention is to provide a model of which the body portion can move corresponding to the magnitude of the sound produced.

It is yet another object of this invention to provide a model of which the movement of the body portion is precisely synchronized with generation of the sound.

It is an additional object of this invention to provide a model of which the movement of the body portion is quite natural even when a high-speed sound is produced.

A further object of this invention is to provide a model of which the movement of the body portion ends when the mouth of the model becomes closed.

Other objects of this invention will become apparent from a consideration of the following detailed description of the invention.

BRIEF DESCRIPTION OF THE DRAWINGS

FIGS. 2 to 17 are drawings showing in detail the structural parts of the device of this invention, wherein:

FIG. 2 is a sectional view showing an embodiment wherein the present device is adapted to simulate a panda model;

FIGS. 3A and 3B are perspective views showing a manufacturing step in producing the model of this invention;

FIGS. 4A, 4B, 4C, 4D, 4E, 4F and 4G are sectional views showing an internal grooving process in producing the model step by step;

FIGS. 5A and 5B are partial enlarged vertical sectional views of one embodiment;

FIG. 6 is a partial enlarged vertical sectional view of another embodiment;

FIG. 7 is a partial enlarged vertical sectional view of a joint portion;

FIGS. 8A and 8B are partially cut-out perspective views of element 101 showing same in distorted position;

FIG. 9 is a partially cut-out perspective view of another distorted portion;

FIG. 11 is a partial side sectional view of another embodimwnt (where the invention was adapted to gorilla model;

FIGS. 12 and 13 are partial vertical sectional views of different embodiments;

FIG. 14 is a partial vertical sectional front view of an embodiment (gorilla model);

FIG. 15 is a partial vertical sectional side view of another embodiment;

FIGS. 18 to 21 are illustrative drawings of the mechanism for performing the opening and closing movements of the mouth of a model according to this invention, wherein FIG. 18 is a sectional view of the head portion of a bear model according to this invention;

FIG. 19 is a perspective view showing an embodiment of the driving mechanism according to this invention;

FIG. 20 is a block diagram showing an embodiment of electric circuitry arrangement according to this invention; and FIG. 21 is a time chart showing a mode of operation of said electric circuitry.

DESCRIPTION OF THE PREFERRED EMBODIMENTS

Figure 1:
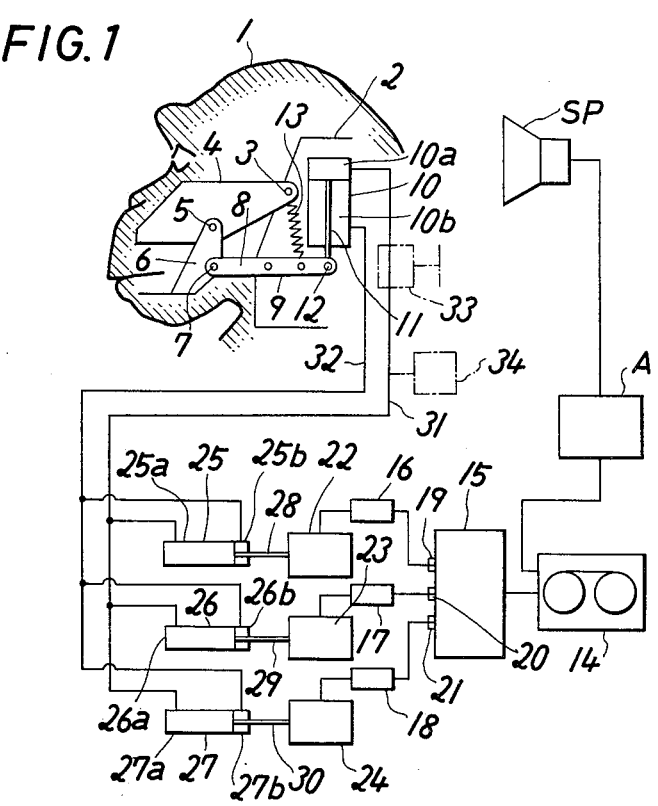
FIG. 1 is a block diagram showing the parts arrangement in one embodiment of this invention.

The present invention is described first by way of an embodiment thereof with reference to FIG. 1, concerning the driving means for operating the body portion of the model and the controlling means therefor.

In FIG. 1, reference numeral 1 indicates the head portion of an animal, for example an ape, forming a part of the body portion 101 of the model which is to be described in detail later. Numeral 2 is a support block disposed in said head portion 1. Secured to said support block 2 is an upper jaw plate 4 which is swivelable about a pivot 3. Pivotally joined to a pertinent lower part of said upper jaw plate 4 is a lower jaw plate 6 which is swivelable about a pivot 5 planted on said upper jaw plate. These upper and lower jaw plates 4 and 6 are fixed to the upper and lower jaw portions, respectively, of said model ape and arranged to be movable in accordance with the movement of the operating members to be described later. It will be also seen that a link member 8 is pivotally joined by a pivot 7 to a central part of the right edge of said lower jaw plate 6 so that said link member is swivelable about said pivot 7. Said link member 8 is also pivotally supported at its central part by a pivot 9 which erects from said support block 2. The right end of said link member 8 is pivotally joined by a pivot 12 to a piston rod 11 of a cylinder 10 mounted on said support block 2 so that said right end of the link member 8 is swingable about said pivot 12. Interposed between the pivot 3 of said upper jaw plate 4 and said link member 8 is a spring 13 which is so orientated as to pull said two members away from each other.

According to this arrangement, when the piston rod 11 descends under the pressure of oil supplied to the cylinder 10, said link member 8 turns clockwise about the pivot 3 to push the upper jaw plate 4 upwardly while causing the lower jaw plate 6 to turn counterclockwise about the pivot 5, thereby opening the mouth of the model ape.

Concerning now the circuit arrangement of the device, numeral 14 indicates a tape recorder, A an amplifier, and SP a speaker. A tape in which the real cry of ape has been recorded is replayed by said tape recorder to reproduce the recorded cry through the speaker SP. Connected to said tape recorder 14 is a tape recorder output voice level detector circuit 15, and three electromagnetic switches 16-18 are connected to the output side of said circuit. This voice level detector circuit is arranged such that its output value varies in accordance with intensity of the audio signal level and is detected as an analog or distal amount. For instance, in the arrangement shown in the drawing, the output can be selected from three different levels, and said audio current levels are set to three standard grades with respectively predetermined values, whereby when said output reaches the lowest standard level, a current for operating said electromagnetic switch 16 flows to the first output terminal 19, and when said output reaches the intermediate standard level, a current for operating the electromagnetic switch 17 flows to the first and second output terminals 19, 20, while when the output reaches the highest standard level, output appears at all of the output terminals 19, 20, 21 to operate all of said electromagnetic switches 16, 17, 18.

Connected to the output sides of said electromagnetic switches 16, 17, 18 are solenoids 22, 23, 24 which are associated with hydraulic cylinders 25, 26, 27, respectively. These solenoids are energized selectively in accordance with operation of said electromagnetic switch or switches, and upon energization of either or all of said solenoids, the corresponding cylinder or cylinders 25, 26, 27 are actuated to operate the associated piston rod or rods 28, 29, 30. On the other hand, both input and output sides of said respective cylinders 25, 26, 27 are lumped and connected to two input and output oil pipes 31, 32 which are connected to the input side and output side, respectively, of said cylinder 10 as shown in the drawing. It will thus be understood that as said piston rod or rods 28, 29, 30 move to the left, oil in the cylinder or cylinders 25, 26, 27 is forced out from their left-hand chambers 25a, 26a, 27a to flow into the upper chamber 10a of said cylinder 10 through said oil pipe 31, pushing the piston rod 11 downwardly to spread out the upper and lower jaws to open the mouth of the model ape.

Thus, according to this arrangement, the opening and closing movement of the ape mouth varies in three stages in correspondence to the intensity of the voice issued from the speaker SP, and the opening of the mouth is synchronized with the pitch of the voice.

When no voice or sound is produced from the tape recorder 14, the energizing current to said solenoid or solenoids 22, 23, 24 is shut off and no oil pressure is supplied to the cylinders, so that said link member 8 is turned counterclockwise by the restorative force of said spring 13 to push back the piston rod 11 in said cylinder 10 upwardly, causing oil in the upper chamber 10a to return into the left-hand chambers 25a, 26a, 27a of said cylinders 25, 26, 27 through the oil pipe 31, whereby said piston rods 28, 29, 30 return to the original positions to stay ready for the next movement. There is no need of providing any back-flow valve in the oil pipe 31 because as far as said solenoids 22, 23, 24 are not energized, the piston rods 28, 29, 30 stay at the extreme right ends and won't be force back further to the right.

When said cylinder 10 operates downwardly, oil in the lower chamber 10b therein is guided into the right-hand chambers 25b, 26b, 27b of said respective cylinders 25, 26, 27 through the oil pipe 32, whereby no oil pressure works now and hence the piston 11 in said cylinder 10 receives no back pressure and operates smoothly.

By providing a flow control valve 33 in one or both of said oil pipes 31, 32, it is possible to control speed of either opening or closing movement or both movements of the ape mouth to realize even more minute mouth movement of the model ape. Also, an additional oil supply means 34 may be provided in the piping system including at least said both oil pipes 31, 32 so as to supply oil leak, drop of oil pressure or other losses in the strokes.

In the mechanical system including said mouth moving mechanism, there could arise trouble such as delay of operation due to frictional loss, reduced follow-up action of the spring or increased viscosity of oil, causing a delay in the mouth opening and closing movement and non-synchronization with the voice output from the speaker SP. In order to cope with such delay, two reproducing heads may be provided as time constant means in said tape recorder 14, said two reproducing heads being spaced from each other by a distance corresponding to the time of said possible delay and arranged such that the first head output will be supplied to said audio level detector 15 and the other head output will be supplied to said speaker SP, thereby to allow maintenance of the desired condition of synchronization.

I will now describe the mechanism of the body portion of the model of this invention, which is operated by the abovedescribed driving means and control means, by way of embodiments shown in FIGS. 2 to 17.

Figure 2:
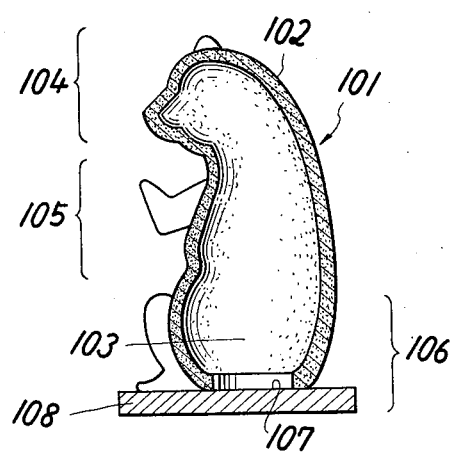

Referring to FIG. 2, there is shown a vertical sectional view of a model of a panda according to this invention. Numeral 101 indicates the body portion made of a soft foamed urethane resin block. The exterior 102 of the body portion is shaped after the body form of a panda, and the interior of the body portion is bored to provide a space 103 for housing the driving means not shown. Thus, according to the present invention, the body portion 101 of the model of an animal, etc., is formed from a soft foamed urethane resin block, so that it can be easily shaped into the form of any desired animal, and as movement is given to said body portion by the driving means incorporated therein, there can be realized a movement closely analogous to the bodily movement of the real animal. Further, the model is suited for decorative display, and easy to handle, carry and install.

Although there are several different kinds of soft foamed urethane resins which differ in properties and quality, no specific definition is placed on the kind of such resin used in this invention. Generally, however, the one with fine foams, soft in quantity and tender to the touch is best suited, but a rough one is not objectionable. In view of the fact that the model of this invention is intended for use as display or for decorative purposes, it is desirable to use such type of urethane resin which is resistant to water, heat and sunrays, incombustible or flame-retardant, and high in tensile strength and stretchability.

Now, the manufacturing process of the above-described animal model according to this invention is described step by step with reference to the drawings showing several different embodiments.

As the first step, the size, pose and pattern of movement of the animal model to be made are determined by consulting the data obtained from photographs, pictorial representations, observation of the real animal, etc. Then, for outlining the mechanism for realizing the decided pattern of movement, the external configuration of the animal is drawn by considering the body structure such as skelton, muscular structure and other data on the animal concerned. (Generally, the movement closely analoguous to that of the real animal can be produced by properly selecting the skelton, articular structure, joint positions (fulcrums), etc., which have close resembrance to those of the real animal). In view of the fact that the commercially available urethane foamed blocks are mostly sold in rectangular shape, it is convenient for the succeeding steps to make the drawings of the body configuration from at least three aspects: front, side and plan.

In determining the general shape of the model, careful selection should be made on the pose of the animal to be drawn so as to give a dynamic reality to the model. In this connection, it is to be noted that urethane foam used for forming the body portion in this invention is suited for contraction and not for elongation, so that it is recommended to avoid a shape which involves the possibility that a certain part of the body be stretched out largely in the course of a movement.

Therefore, as regards a part which makes a reciprocative movement, it is desirable to select a shape which is just in the midst of the movement. This proves advantageous when a large part of the model, such as body, head, etc., is supposed to make a movement with a relatively small amplitude or a shaking movement to the right and left through a same distance for both sides. As for the opening and closing parts such as mouth or articular portions of the limbs, it is recommended to make them in a spread-out or stretched condition so that they are movable in a way such that the inside of such part is "squeezed" down. The urethane foam blocks available on the market are of the maximum size of about 2000×12000×600 (mm), so that they are undersized for use in individual form for framing the animal model of this invention. Therefore, in case of using such urethane foam blocks, several pieces of such blocks are bonded together to form a larger block of a desired size. In this case, use of a synthetic rubber adhesive (such as "Saiko", "Sony Bond", "Cemedine Contact", etc.) is recommended, and such synthetic rubber adhesive is applied as thin as possible on the opposing sides of the unit blocks to be bonded so as not to impair flexibility of the urethane foam. In this way, there is prepared a rectangular block 110 with the dimensions required for making an animal model of a desired size. In case of making a large-sized model, there may be prepared several pieces of such blocks, such as those for the head portion (104), body portion (105) and tail portion (106), and after rough carving of each of these blocks, they may be bonded together integrally and then subjected to finish carving as described in more detail later. As for the protuberant parts such as ears, horns, tail and particularly limbs, it is recommendable to make them separately and bond them to the main body because much loss of material is suffered when such protuberant parts are carved out integrally with the main body.

As for designing of the driving means for operating the said body portion, the necessary fulcrum positions and dimensions are determined from the already completed external shape drawing on the basis of the ideas on the decided mechanism, and a plan is drawn up by taking into consideration the material used, sizes of parts and other factors. The mechanical block constituting said driving means should be so dimensioned that it can be snugly housed (with certain leeway) in the space 103 formed by boring the body portion so that said mechanical block won't hit against the body portion 101 of this invention is made of an elastic material, the above-said arrangement may not be so strict, and a slight dimensional error can be well absorbed. What is important is that every fulcrum for movement is set at a position as much close to that of the real animal as possible. At this stage, there are also decided the joining portion 152 for the foamed urethane resin made body portion 101 which becomes the "investment" of the model and the actuator end 151 of the driving means which is to be further described later. Such joining portion 152 may be usually formed by making a planar face on a working portion of the machine and fitting or bonding thereto a correspondingly shaved interior part of the body portion 101. If no such planar face is obtainable, a separately made cover-like block 153 may be fixed to the machine side so that the external surface of such block will serve as the faying surface. In this case, as the face of said block bonded with the machine side provides a support for the weight of the investment, such face is preferably provided with a sufficient area for such support. Actually, however, the investment can substantially support its own weight by itself, so that said area may not necessarily be so large; it suffices to provide an area sufficient to prevent deformation or inclination under the weight of the investment and to well transmit movement of the body portion. In the case of an animal model of a normal form, it suffices to make bonding only at the head portion 104 if no other specific motion-transmitting portion is required. If the portion of buttocks 107 of the model animal in a seated or squatted posture is supported by a pedestal 108, a perfect support for the investment is provided.

In the succeeding rough carving step, a prototype pattern is attached to the external (planar) surface of the urethane foam block prepared in the described manner, and the contours are traced. Usually, as shown in FIg. 3A, contours 111 are drawn on both sides 110b, 110b of the block 110, and in case of an animal with a relatively simple front feature (such as seal, lion, megalosaur, etc.), carving in the round may be immediately started to form the external shape 102. In the case of an animal having a complicated and nonsymmetrical feature in the front configurations are further drawn on the blank (carved to the stage shown in FIG. 3B, and then carving in the round is begun.

It is very troublesome job to accurately carve the regions connecting both contoured sides of the blank, and actually, a precise carving is required only on the median line 112. Therefore, work can be done more efficiently and accurately by dividing the block 110 into two along the median plane, drawing contours on the divided faces and immediately beginning carving in the round toward both sides. As the block is bisected for boring along the median plane, no trouble arises from such dividing of the block.

Carving in the round is started from the external side of the block 110 by using a sharp knife or other means. Soft and elastic urethane foam is not usually considered as a carving material, but such urethane foam is essential for effecting movement of the carved model. This material is also advantageous for the carving method in which a shape is carved from the external side. For instance, it is very difficult with an ordinary hard material to cut out largely unnecessary portion because deep cut-in is retarded by swarfs or shavings which stay in the cut. In the case of urethane foam, shavings are soft and easy to bend and therefore don't obstruct extensive cutting. Also, carving of a recession is very difficult with a hard material, whereas in the case of a soft and flexible material such as urethane foam, a recession may be flattened by depressing its edge, allowing as easy carving thereof as along a flat plane.

Further, in a hard material, it is impossible to turn the cutting edge thrust deep into the material, but the cutting edge can be turned freely in a desired direction in the urethane foam material because of its flexibility, so that any curvature can be carved quickly. It is also possible to carve a complicated portion will ease. Usually, it is extremely difficult to carve the inside parts of the crossed legs or folded arms or the chest or belly portion below the folded arms. In such a case, if urethane foam is used, any intricate part can be carved with ease by pushing aside any obstructive portion because the legs and arms, if separated from each other, can be moved freely.

The material such as urethane foam, which is soft and indeterminate in shape, has been considered unsuited for carving or sculture, but in the present invention, such properties of urethane foam are turned to good account for quick and easy carving of a model.

The thus rough-carved block (substantially shaped like an animal) is then subjected to boring. Boring has two objects: providing a space for housing the machine (driving mechanism) in the animal model and facilitating movement of the model, so that such boring is performed in two stages.

Boring of the first stage is intended for making a space in the model. The size and motion of the machine are determined in the stage of design such that the machine stays always about 100 m/m inside from the external surface of the model, and a space required therefor is provided by boring. Usually, first-stage boring is made such that the torso portion 105 will have a thickness of 50 to 150 m/m (which differs depending on the size of the animal mode to be formed), and no boring is made in the arms, legs and tail unless a specific machine is set therein. Care should be used so as not to thin the investment more than a certain degree, otherwise the investment may collapse under its own weight or may be deformed during movement. Thus, a thick-ness of the above-said range is essential for ensuring maintenance of the model shape. In practicing boring, usually the sculpture 122 is divided into two portions along the median plane 121 as shown in FIG. 4A, then a line 124 is drawn on the cut section 123 along and constantly spaced from the external surface of the sculpture 122 as shown in FIG. 4B, and then cutting is performed along said line 124 by a cutting tool 125 as shown in FIG. 4C.

Cutting is further continued by thrusting the cutting edge 125 more deeply while spreading out the portions 126, 126 on the outside of the cut line as shown in FIGS. 4D and E until the inside portion 127 is finally cut out (see FIG. 4F. The remaining portion 128 is further carved to let it have a uniform thickness (FIG. 4G. This completes the first-stage boring. There are, however, cases where such boring is insufficient because of a greater machine size. In such a case, proper boring size is determined from the design drawing and proper boring is performed.

Second-stage boring, which should rather be said internal grooving or scooping, is intended for facilitating movement of the movable parts of the model. Such movable parts may be roughly divided into the following three types: expanding and contracting parts, twisted or kinked parts, and parts around the mouth. The expanding and contracting parts include the belly and back portions when the body moves back and forth or up and down, the parts around the neck when the latter is shaken, and expandable and contractable joint sections. In case the model is supposed to make a movement such that the whole body stretches out, the whole torso becomes an expanding and contracting part.

In each of these parts are scooped grooves of a flexible structure in the direction perpendicular to the direction of expansion and contraction. For instance, grooves 131 such as shown in FIG. 5A are cut from the inside of the block such that the thickness between the bottom 131a of each said groove and the external surface of the block 102 will be around 20 m/m. This allows the investment to bend while maintaining its external shape. If no such grooves are provided, the block, when bent, is deformed just like when a metal pipe or paper cylinder is bent. However, if said flexible structure is provided, the thin and weak portions absorb expansion or contraction while the thick and strong portions act to maintain the sectional shape as shown in FIG. 5(B), so that any part can maintain the correct sectional shape.

In the case of a furry animal model made by bonding a seal (artificial fur) 132 to the urethane foam made body portion 101, each said groove 131 may be perfectly cut through as shown in FIG. 6.

A similar structure may be adapted to the joint portions of the limbs. In the example shown in FIG. 7, an investment portion corresponding to a joint 133 is slightly hollowed out at 134. This is intended for facilitating movement rather than preventing deformation.

Similar hollow-out is also made in every twisted or distorted portion. For instance, when a squatting animal looks around by turning its shoulders, a kink develops in the torso. As the resistance produced against such kink is very strong, the waist and legs may be forced to turn with the shoulders if the machine power is low.

In order to solve this problem, there are formed cuts 135 parallel to the axis of rotation as shown in FIG. 8A. Owing to existance of such cuts 135, there is produced a divergence such as shown by arrows A and B in FIG. 8B between both sides 135a, 135a of each cut 135 to greatly alleviate the degree of kink or distortion produced in the torso. This arrangement can be applied to an animal model having a seal bonded to the investment 102. In the case of an animal model having no seal, axial grooves similar in configuration to the aforesaid cuts 135 but not cut through are formed internally as shown in FIG. 9. This arrangement can produce a same effect as provided by that shown in FIG. 8, and in this case, it is essential that each groove 136 has a fairly large width.

Figures 10A, 10B:
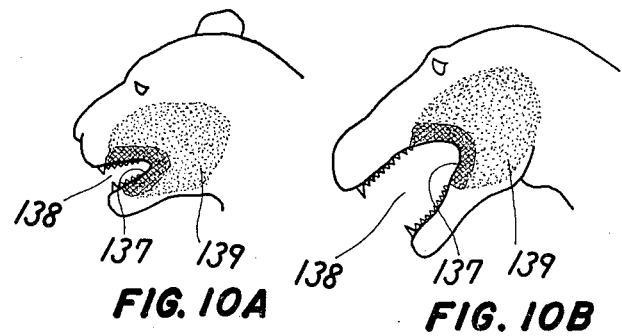
FIGS. 10A and 10B are partial side views of the models.

Similar grooving is also required for absorbing distortion caused by opening and closing or masticatory movement of the mouth. Generally, resistance is reduced if the sectional area of urethane foam expanded or contracted by the machine is lessened, but if the investment is thinned too much for reducing resistance, it may be deformed to let the face get out of shape. Therefore, there is required a good combination of the portions with enough thickness to retain shape and the portions thinned down for reducing resistance. An example of such combination is shown in FIGS. 10A and 10B. It will be noted that the shape of the mouth 138 is retained during movement by the thick portion 137 which corresponds to the lips, while the portion 138 inside each cheek is thinned for reducing resistance against movement.

Other various types of grooving may be required according to the external shape of the animal model to be manufactured or the desired pattern of movements of such model.

The thus completed urethane foam block is then combined with the mechanical operating unit in the following way. The investment finished with internal grooving is bonded into the original form by leaving an opening (usually along the median line on the back) necessary for machine inspection. In this case, the mechanism for the head, etc., may be joined simultaneously, or the investment may be bonded along the median plane after covering the machine with it, or the head, etc., may be joined later. Such order of joining may be suitably selected as occasion demands.

Figure 11:
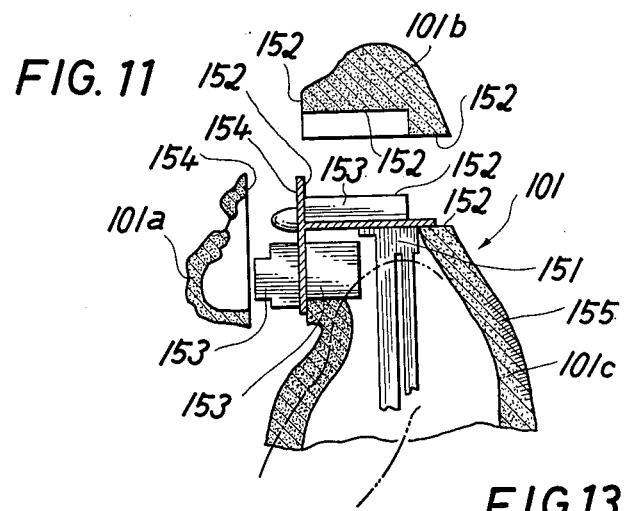

Referring to FIG. 11, there is shown a side view of the head portion of a gorilla model. The investment is divided into the face segment 101a, head top segment 101b (divided into right and left portions), and torso segment 101c (divided into right and left portions) as shown in the drawing. After internal grooves such as above-described have been formed, said respective segments are fitted over the machine and successively joined together along the joints with the machine to restore the original shape.

Figures 12, 13:
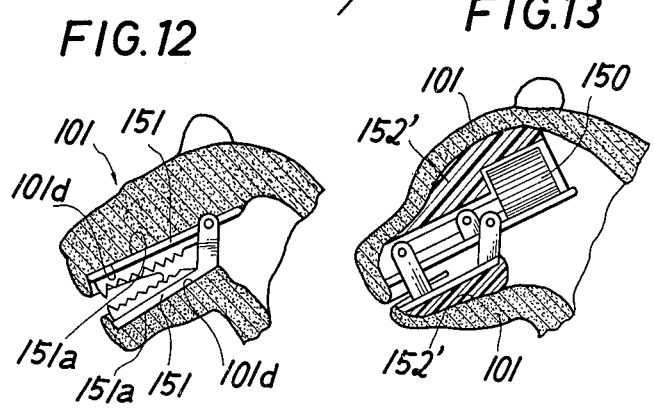
Figure 14:
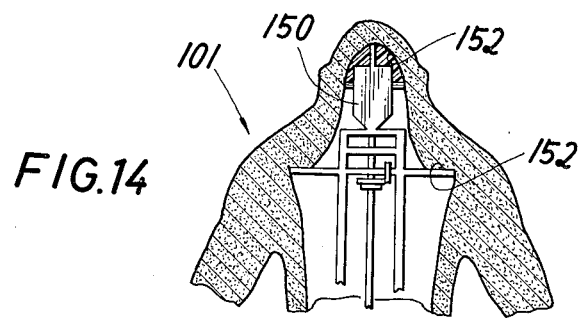

As viewed above, joining is required only at a few sections. Usually, the head portion alone needs to be joined, and in some other cases, one or two additional portions are required to be joined. There are two methods for effecting such joining of said portion or portions: a method in which the investment is directly bonded to the machine, and a method in which an intermediate framework is formed over the machine and the investment is bonded to such framework. In case of directly bonding the investment to the machine, for instance, when the body portion (investment) 101 is directly bonded to the driving end 151 of the machine as shown in FIG. 12 showing the head portion of a lion, the body portion 101 is left thick enough to come into contact with the machine at 101d, and this part 101d is bonded with rubber adhesive to a flat face 151a formed on the machine. This method is recommended when no mechanism is housed in the head portion. This is most simple method and involves no possibility of causing deformation of the investment. This method cannot be applied when a driving unit 150 is installed in the head portion, so that in such a case, a skull 152' designed to serve concurrently as a cover of the driving unit 150 is prepared and set in position, and the investment 101 is bonded thereto as shown in FIG. 13. The skull 152' is made by carving foamed polyethylene resin material, and rubber adhesive is applied to both machine and investment. According to this method, it is difficult to set the skull such that its external surface agrees precisely with the corresponding internal surface of the investment, and the investment is liable to deform. In case an operating mechanism is set in the shoulder portion, a joining face 152 is also formed at the part where such mechanism is located. FIG. 14 shows a model gorilla equipped with a mechanism for turning the shoulders sidewise. As the once bonded portions can never be separated again, it is important to provide a removable section or sections allowing required exposure of the mechanism for inspection or repair, or to make the design such that required inspection or repair can be accomplished through an opening or openings provided in the investment. In the case of the gorilla shown in FIG. 11, no adhesive is applied to the joining face 154 to the machine and the face portion 101a is joined to the machine merely by an external seal, so that the face portion 101a can be separated to make repair, etc., by cutting said seal. (Such seal can be repaired by sewing or other means). The mechanism in the inside of the head portion 101b can be inspected or repaired by inserting a hand or tool from the opening provided by remoding said face portion 101a or an opening 155 (shown by oblique lines) in the back.

In a section where it needs to perfectly bond a part of the mechanism to the investment, there is employed a double structure comprising a portion which is fixed to the investment and a portion which is merely joined by bolts or screws, so that the internal mechanism may be separated from the investment by removing such bolts or screws.

Figure 15:
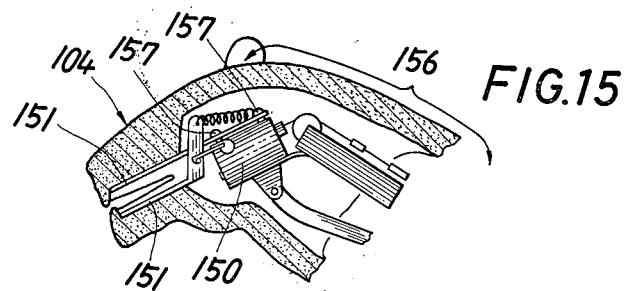
Figures 16A, 16B, 16C:
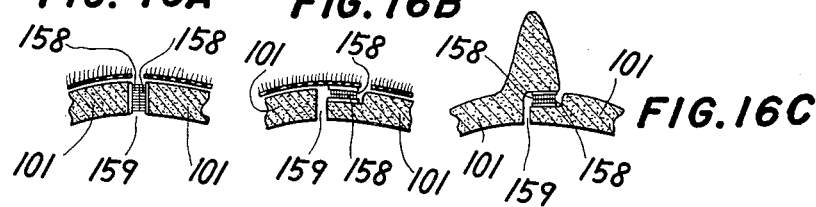
FIGS. 16A, 16B and 16C are partial sectional views of the opening and closing portions.

In the case of the lion head portion shown in FIG. 15, the driving end 151 (having an opening and closing structure comprising upper and lower jaws and a restoration spring is unremovably bonded to the interior of the head portion 104, but this portion is very simple in structure and free of trouble. On the other hand, the first portion adapted for effecting opening and closing motion of the mouth and the second portion including a mechanism for twisting (turning) the head to the right and left are complicated in structure and have a risk of failure. These two portions are joined together by screws 157 in the double-structured section 156 in the rear head portion, so that said first and second portions can be separated from each other by merely removing said screws 157, allowing perfect removal of the investment together with the first portion, so that the parts of the mechanism associated with the second portion in the drawing are easy and free to repair, replace or change. Any slit or opening provided in the investment should be of a structure which allows anyone to open with ease but, once closed, inhibits inadvertent opening even if the investment moves with operation of the machine. Usually, there are employed the structures such as shown in FIGS. 16A, 16B and 16C. Each structure uses a Bellcule Fastener (commercial name) 158 (or Bellculo, Magic Tape). Such fastener is adapted in a cut 159, or in the vicinity thereof, formed in the investment 101 to allow easy opening and closing of the cut.

In the case of an animal with a long neck, such as giraffe, dragon, etc., it is liable that the articular structure of the moving mechanism should touch and damage the neck portion of the investment, or such articular structure should push the investment from the inside thereof to give an unnatural stiff impression. In order to prevent this, a vinyl chloride made flexible pipe designed to perform the triple functions of protection, buffer and smoothness of movement is inserted between the machine and the investment.

Figures 17A, 17B, 17C:
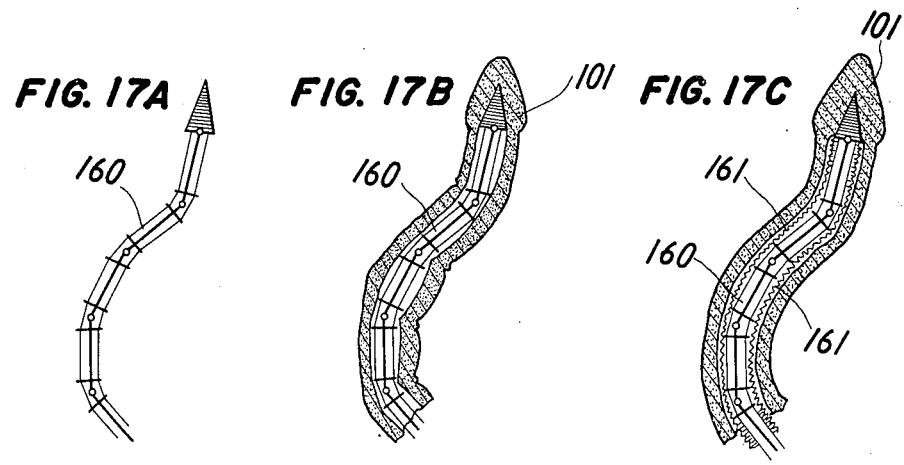
FIGS. 17A, 17B and 17C are partial vertical sectional front views showing different embodiments.

In case of using a skelton 160 such as shown in FIG. 17A in the neck portion, if such skelton is directly covered with the investment 101, the machine may touch the investment or the investment may be pushed by the machine to form uneveness on the external surface as shown in FIG. 17B, or the stiff sense of the skelton may be transferred to the investment to give an unnatural impression. On the other hand, if a flexible pipe 161 is inserted between the machine and the investment as shown in FIG. 17C, the movement of the neck portion becomes natural, producing a smooth curve just like the living counterpart, and also there is eliminated any risk of touch of the investment and machine and resultant damage thereto. The appurtenances of the jaw bone, such as teeth and gums, should be attached to the machine before joined to the investment.

After completing joint of the body portion and the machine adapted as the driving end of the driving means, the exterior of the urethane foam investment is finished into an appearance of a real animal. The finish process of course differs between the fur-bearing animals such as panda, lion, etc., and the non-fur-bearing animals such as sea bears, giraffes, etc. In the case of the fur-bearing animals, the exterior of the urethane foam investment forming the body portion is shaved off by an amount equivalent to the thickness of the fur to be attached, and then the fur is secured, as by bonding, to the external surface of the investment. In the case of the non-fur-bearing animals, the exterior of the rough-carved model is polished by sand paper and/or further colored to finish into an animal model.

According to the model of this invention having housed in its said body portion a driving mechanism and a control means such as diagrammatically depicted in FIG. 1, arrangement is made such that the signals for inducing said actions and for reproducing a sound (cry, voice, etc.) from a sound source will be produced simultaneously and synchronously, so that movement of the model animal, doll, etc., is made just like that of the real counterpart to enhance its advertising effect. Also, as the operating mechanism is arranged to allow change of the amount of said movement in accordance with the output level of the signal for producing a sound obtained from said sound source, the movement follows the mode of the sound to give even a greater sense of reality. Further, as arrangement is made such that the hydraulic pressure in the cylinder is changed in accordance with the output level of the signal for producing a sound obtained from the sound source and that such change of hydraulic pressure is further converted into a regulated amount of movement, even a small change of electric signal can be converted into a large change of force, allowing smooth performance of a large movement of the model animal.

Still further, as a flow control valve is provided in the piping system which controls the operation caused by said hydraulic pressure, it is possible to optionally change the speed of said movement, and as an oil supply means is associated with said piping system, safety and sureness of the operations of said hydraulic system are ensured.

It is to be also noted that either the signal for inducing said actions of the signal for producing a sound obtained from the sound source is associated with a time constant means to correctly synchronize the movement with generation of the sound. Also, the output of a tape recorder is utilized as the sound source and said tape recorder is provided with first and second reproducing heads arranged in the direction of travel of the tape, with the output of said forst reproducing head being utilized as the signal for inducing the said movement and the output of said second reproducing head being utilized as the signal for producing a sound, so that a perfect synchronization between said movement and sound generation is provided.

Further, according to the present invention, since soft foamed urethane resin is used for the principal parts of the body portion forming a model of an animal, etc., it is possible to easily shape the contour of an animal, etc., just like that of the real counterpart, by merely carving the said material. Also, as the whole body portion is formed from a single elastic resin block, the movement induced by the driving means incorporated in the body portion becomes closely analogous to that of the real animal. Further, as the entire weight of the model can be strikingly lessened as compared with the conventional ones, such model is easy to handle to allow easy transport or display, and as the model is constructed as if it is wrapped up by an elastic investment, it won't be damaged by a slight external impact during transport or installation.

Carving of the model can be accomplished by merely imitating the external shape of the real animal, etc., and it is not subject to any specific restrictions in producing desired movement. Adjustment of expansion and contraction of any moving part can be attained by merely controlling the amount of internal grooving or scooping of the body portion. As for incorporation of the driving means in the body portion, it is to be noted that any slight dimensional errors of the housing space and driving means can be absorbed by elasticity of the material of the body portion, so that manufacture of the driving means itself becomes easy.

Further, as the external shape of the model is maintained by foamed urethane resin, the model can retain the original shape even in long-time display and hence produces an excellent effect as a display article.

According to the model mechanism described above and shown in FIG. 1, the signal for inducing movement and the signal for producing a sound are obtained simultaneously and synchronously from a sound source so as to perfectly synchronize the model movement and sound (cry, voice, etc.), so that the speed of movement is restricted by the speed of response of the driving system and hence it is difficult with this mechanism to effectuate a quick movement conforming to rapid talking. Particularly, in case a hydraulic cylinder is used as driving unit, such hydraulic cylinder is slow in response and it is difficult to obtain such a hydraulic cylinder which has a practical size and configuration for adaptation in a model and yet is capable of producing a sufficient driving power.

Such problem, however, can be solved by employing an arrangement such as shown in FIGS. 18 to 21.

In the embodiment described below, arrangement is made such that the opening and closing movement of the mouth of the body portion of the model formed from a soft foamed urethane resin block in the manner described above is initiated upon detection of an audio signal from the sound source, and such movement is completed by a signal which has detected that the mouth has been brought back to the closed position upon lapse of a certain predetermined period of time after detection of said audio signal.

Figure 18:
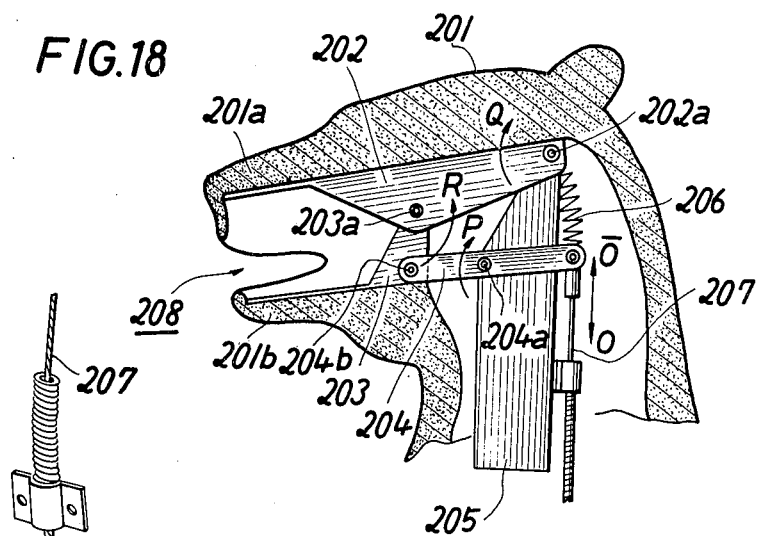

Referring to FIG. 18, there is shown a side sectional view showing the construction of the head portion in an embodiment where the present invention was adapted to a bear model. In the drawing, head 201 constitutes a part of the body portion (not shown) formed from a soft foamed urethane resin block proposed by this applicant as just described above. The soft foamed urethane resin block was shaped into the form of a bear, and its head portion contains a four-joint link mechanism comprising an upper jaw plate 202, a lower jaw plate 203, a lever 204 and a support member 205.

This link mechanism has the following construction. As will be seen, the support member 205 is secured to the neck portion of the model body and adapted to support said head portion 201 relative to the body portion not shown. Pivotally joined to said support member 205 is the upper jaw plate 202 which is turnable about the pivot 202a, and pivotally joined to a lower part of said upper jaw plate 202 is the lower jaw plate 203 which is turnable about the pivot 203a. Said lever 204 has its central part pivotally supported by a pivot 204a planted on said support member 205 and has its left end also pivotally supported by a pivot 204a planted at a right end (in the drawing) of said lower jaw plate 203. It will be also seen that a spring 206 is interposed between the right ends of said upper jaw plate 202 and lever 204.

Figure 19:
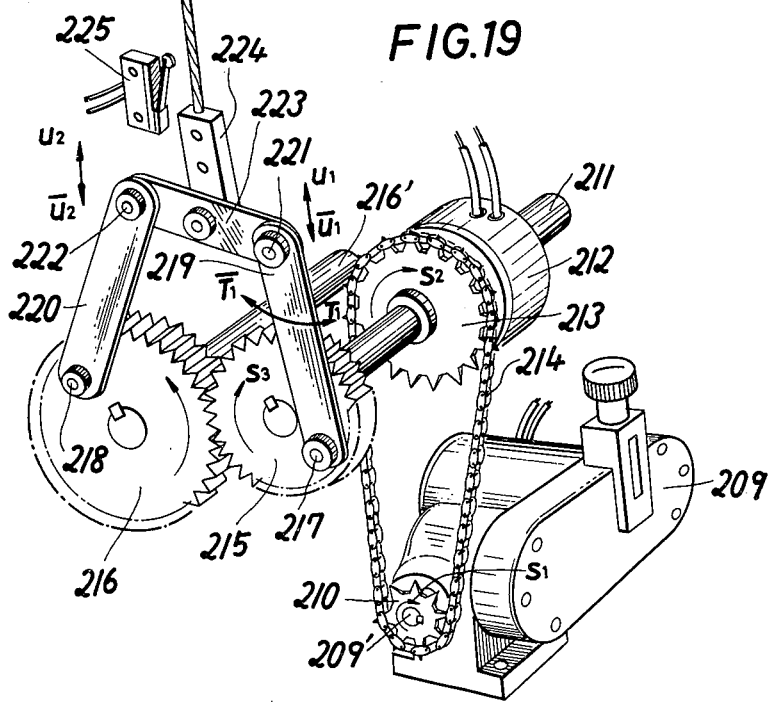

According to this link mechanism, said both upper and lower jaw plates 202 and 203 are secured to the upper jaw 201a and lower jaw 201b, respectively, in the mouth 208 of the head portion 201, and a wire 207 is joined to the right end of the lever 204 to thereby transmit the driving force from a driving mechanism such as shown in FIG. 19, which will be described later.

This link mechanism operates as follows. When the right end of the lever 204 is pulled down (in the direction of arrow O in FIG. 18) by the wire 207, said lever 204 turns clockwise (in the direction of arrow P), causing the upper jaw plate 202 to turn also clockwise (in the direction of arrow Q) and the lower jaw plate 203 to turn counterclockwise (in the direction of arrow R), thereby opening the mouth 208 of said head portion 201. Then, when the pull to the lever 204 by the wire 207 is released under this open mouth condition, the right end of said lever 204 moves up (in the direction of arrow $\overline{O}$) under the force of spring 206, bringing the mouth 208 back into the closed position.

The driving mechanism for operating the just described link mechanism has an arrangement such as shown in FIG. 19. There is provided an electric motor 209 operatively associated with an infinitely variable change gear system, and a chain 214 is passed between a first transmitting gear 210 mounted on the drive shaft 209' of said motor and a second transmitting gear 213 engaged concentrically with a first resolving shaft 211 through and electromagnetic clutch 212. Said first revolving shaft 211 is journalled by a bearing not shown and mounts at its one end a small-sizer gear 215. Meshed with said gear 215 is a large-sized gear 216 which is securely mounted on one end of a second revolving shaft 216' which is also journalled by a bearing not shown.

Said large-sized gear 216 has a greater number of teeth than the small-sized gear 215, and each of these gears has planted on its end face a crank pin 217, 218.

Pivotally joined at one end by these crank pins 217 and 218 are connecting bars 219 and 220, respectively, which are also pivotally joined at other ends by pivots 221 and 222, respectively, to a balance bar 223, and a slider 224 is an end of the wire 207 whose other end is connected to the right end of the lever 204 as described above and shown in FIG. 18.

In FIG. 19, numberal 225 indicates a limit switch which is normally closed but opened upon upward movement of said slider 224 to the limit point to thereby detect that the mouth 208 of the head portion 201 was brought back to its closed position. This limit switch is described in further detail later in connection with the electric circuitry arrangement of this invention.

This driving mechanism operates as follows. Revolution (for instance in the direction of arrow $S_1$) of the drive shaft 209' of the motor 209 is transmitted from the first transmission gear 210 to the second transmission gear 213 through chain 214. When the electromagnetic clutch 212 is in operation, the first shaft 211 is forced to rotate (in the direction of arrow $S_2$) by rotation of said second transmission gear 213, causing the small-sized gear 215 to rotate in the direction of arrow $S_3$, whereby the connecting bar 219 is urged to make reciprocating motions in the directions of arrows $U_1$ and $\overline{U}_1$ while pivotally turning about the pivot 221 in the directions of arrows $T_1$ and $\overline{T}_1$. The large-sized gear 216 meshed with said small-sized gear 215 rotates like-wise, causing the connecting bar 220 to make similar reciprocations in the directions of arrows $U_2$ and $\overline{U}_2$.

The distance and period of reciprocations of said pivots 221 and 222 are detertimed by the size (diameter) and gear ratio of the small and large-sized gears 215 and 216.

The balance bar 223 pivotally supported at its ends by said pivots 221 and 222 makes intricate reciprocations involving both the reciprocating movements with a large moving distance and period induced by rotation of the large-sized gear 216 and the reciprocating movements with a small moving distance and period induced by rotation of the small-sized gear 215. Therefore, such various patterns of movement of said balance bar 223 are transmitted to the right end of the lever 204 of said link mechanism through the wire 207 connected to the slider 224 pivotally supported to a central part of said balance bar 223. Consequently, opening of the mouth 208 in the head portion 201 can be effected in various modes according to the movement of said link mechanism; for instance, it may be opened largely or slightly, or may be opened quickly or slowly as desired.

Figure 20:
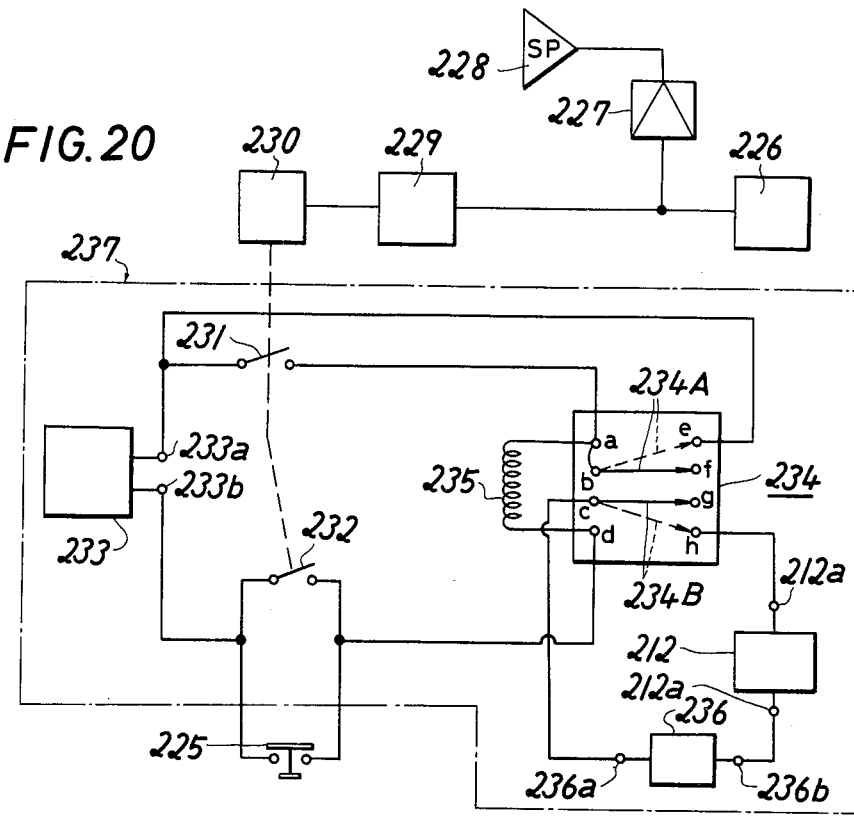

The electromagnetic clutch 212 in said driving mechanism is controlled in its operation by an electric circuit system such as shown in FIG. 20.

Figure 21:
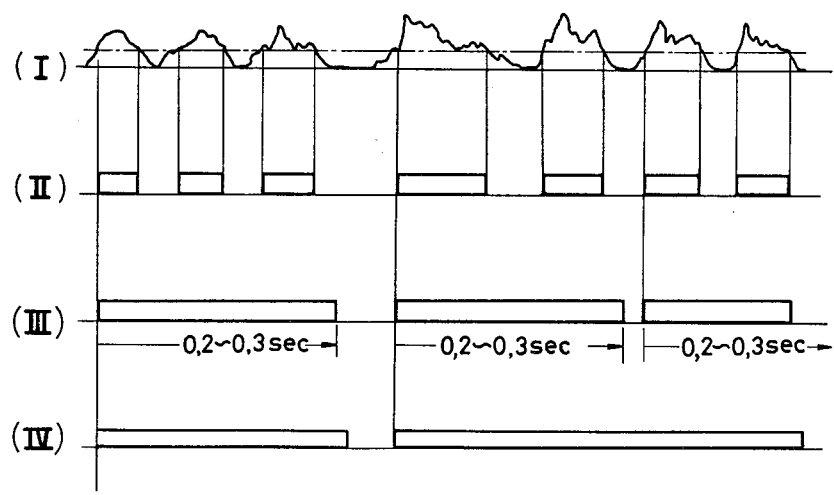

According to the electric circuitry arrangement of FIG. 20, the audio signal from the sound source 226 comprising a microphone, a magnetic reproducing device, etc., is amplified by an amplifier 227 and given out as a sound (cry, voice, etc.) from a speaker 228. Said audio signal (an example of its wave form is shown in FIG. 21 (I)) is also supplied to an audio level detection circuit 229 which detects the intensity of said audio signal at a predetermined level, and when an audio signal exceeding such predetermined level is applied, a timer device 230 is actuated by the detected output signal (shown in FIG. 21 (II)). When actuated by the detected output signal of said audio level detection circuit 229, said timer device 230 maintains its output for a certain period of time (time required for producing one sound or one word, for example, 0.2 to 0.3 seconds), and its output signal (shown in FIG. 21 (II I)) energizes the relay coil (not shown) to connect the first and second relay switches 231 and 232.

It will be noted that said first and second relay switches 231 and 232 are connected at one end to the respective output terminals 233a and 233b of a first power source 233 while the other ends of said relay switches are connected to the corresponding ends of a realy coil 235 in the relay device 232. Connected parallel to said second relay switch 232 is a limit switch 225 which is normally closed but opened when the slider 224 in said driving mechanism is at its limit point of movement.

Said relay device 234 has its respective movable contact pieces 234A and 234B disposed in connection to its second and third terminals 234b and 234c, respectively, and when its relay coil 235 is not excited, said respective movable contact pieces 234A and 234B are in contact with the sixth and seventh terminals 234f and 234g, respectively (shown by solid lines in FIG. 20). Said sixth and seventh terminals 234f and 234g are in an electrically insulated state.

The other input terminal 212b of said electromagnetic clutch 212 is connected to the other output terminal 236b of said second power source 236.

In the above-described electric circuitry arrangement, when the level of the audio signal from the sound source 226 is higher than the predetermined level and a large voice is given out from the speaker 228, the timer device 230 is started by the output signal of the audio level detection circuit 229, so that the first and second relay switches 231 and 232 are closed by the output signal from said timer device 230 to supply an exciting current to the relay coil 235 of the relay device 234 from the first power source 233 through said first and second relay switches 231 and 232. As the relay coil 235 is energized, the second terminal 234b of said relay device becomes conductive with its fifth terminal 234e and the third terminal 234c with the eighth terminal 234h (shown by broken lines). Thus, during the time when the relay coil 235 of said relay device 234 remains energized, a driving current is supplied to said electromagnetic clutch 212 from the second power source 236 through the third and eighth terminals 234c and 234h, whereby rotation of the second transmission gear 213 in said driving mechanism is transmitted to the first resolving shaft 211.

When the second and third terminals 234b and 234e of said relay device 234 become conductive, an exciting current flows directly to the relay coil 235 from one of the output terminals 233a of the first power souece 233 with no medium of the first relay switch 231, so that said electromagnetic clutch 212 is kept operative until the limit switch 225 is opened (the operating conditon is shown in FIG. 21(IV). If no sound is produced for more than a certain predetermined period of time, the relay coil 235 is disenergized as the limit switch 225 is opened when the mouth 208 of the head portion 201 is in the closed position, and hence the mouth opening and closing operation is completed with the mouth being in the closed position.

In this electric circuitry arrangement, the electromagnetic clutch 212 is controlled by a self-retaining control circuit 237 (enclosed by a dotted chain line in FIG. 20), and this control circuit 237 is so arranged that the operation induced by the output signal of the timer device 230 will take preference over the opening operation of the limit switch 225.

Thus, in the embodiment just described, arrangement is made such that the mouth opening movement of the model is varied in its speed and extent when a sound higher than a certain predetermined level is emitted from the speaker, and the mouth is brought to the closed position when the voice is interrupted for longer than a certain predetermined period of time. The rotational frequency of the electric motor provided with infinite variable change gearing can be changed continuously, so that if the speed of the produced voice (average frequency of appearance of the peak of audio signal) is sychronized with the rotational frequency of the small-sized gear, the peak voice audio response becomes substantially consonant with the peak or widest mouth opening movement. Such agreement of the mouth opening or closing movement with the voice from the speaker gives realistic impression of the model itself talking.

According to the above-described embodiments of this invention, since the body portion of the model of an animal, etc., is formed from soft foamed urethane resin, it is possible to easily form the external shape of an animal, closely analogous to the real counterpart by merely carving the material. Also, as the whole body portion is constructed as a single block with good elasticity, the movement induced by the driving means incorporated in the body portion resembles strikingly that of the real animal, and further, since the driving mechanism for producing the mouth opening and closing movement of the model can operate successively during a predetermined period of time, it is possible to give the impression of the model emitting a voice even when talking is at high speed, with no need of increasing the speed of response to the detection of the audio signal from the sound source in correspondence to the voice speed but by merely raising the speed of movement. Moreover, as the movement is completed with the mouth being brought to its closed position, such movement is very natural and the effect of the model as a display article is very much enhanced. Still further, since the weight of the body portion of the model can be lessened as compared with the conventional products, the model is easy to handle and transport and convenient for display. Also, as the model is constructed as if it is wrapped up with an elastic investment, it won't be damaged by slight external impact during transport or installation.

Carving of the model can be accomplished by merely imitating the external shape of the real animal, etc., and is subject to no specific restrictions in reproducing its movement. Adjustment of expansion and contraction of any moving part can be made by controlling the amount of internal grooving or scooping of the body portion. As regards incorporation of the driving means in the body portion, it is to be noted that slight dimensional errors of the housing space in the body portion and of the size of the driving unit can be absorbed by elasticity of the material of the body portion, so that manufacture of the driving unit itself is also facilitated.

Further, as the external shape of the model is maintained by foamed urethane resin, the model will retain its shape even after long-time display and therefore produces an excellent effect as an exhibit.

What is claimed is:

1. A movable sound-producing model comprising:
   (a) a body portion formed from a soft foamed urethane resin block contoured into the external shape of the desired model, and having formed therein a cavity for housing a link mechanism, driving means, and driving-power transmission means contained therein;
   (b) driving means for generating continuous and modulated driving-power to induce movement of said model;
   (c) a link mechanism having a working-end connected to a part of the soft foamed urethane resin block and another end connected to said driving means for inducing movement of the model;
   (d) sound generating means for generating an audio signal;
   (e) accoustic converting means connected to said sound generating means for producing a sound upon receiving an audio signal from said sound generating means;
   (f) level detecting means connected to said sound generating means for detecting an audio signal from said sound generating means when the generated signal is higher than a predetermined level;
   (g) driving power transmission means within said cavity for transmitting driving-power from said driving unit to said link mechanism in response to a driving control signal; and
   (h) control means connected to said driving-power transmission means and said level detecting means for controlling the operation of said power transmission means so as to synchronize the generation of the sound emitted by said sound generating means with the movement of the model in accordance with a detected output signal from said level detecting means to produce a driving control signal at a predetermined period of time to said power transmission means.

2. A model according to claim 1, wherein movement of the model is in part controlled by a link mechanism comprising an upper jaw plate and a lower jaw plate for actuating a movable mouth of said body portion, a support member secured within said body cavity and having first and second fixed pivots disposed therein, an operating lever having one end connected to and driven by said power transmission means, an intermediate portion connected to said first pivot and the other end pivotally connected to said lower jaw plate, the upper jaw plate being connected to said second pivot on said support member, both said upper jaw plate and said lower jaw plate being joined together by a further pivot to thereby permit opening and closing of the jaw plates and mouth of the model upon application of power to said operating lever.

3. A model according to claim 1, wherein said driving means comprises meshed large and small gears, an electric motor provided with an infinitely variable-change gear system connected to and supplying rotational power to said small gear, and a crank mechanism connected to and bridging said large and small gears, whereby said driving means generates continuous and modulated driving power by converting the rotational power of said electric motor to said driving power.

4. A model according to claim 3, wherein the driving-power of said driving means is transmitted from the electric motor to said small gear through electromagnetic clutch means.

5. A model according to claim 4, wherein the control means is provided with means for memorizing a predetermined time, and said control means being so designed as to start driving of said electromagnetic clutch upon detection of an audio signal and to maintain said driving at the predetermined period of time determined by said memory means.

6. A model according to claim 5, which further comprises means for detecting when the mouth of the body portion is at its closed position, the control means being provided with a relay device for supplying a driving current to said electromagnetic clutch from an electric power source, and wherein said relay device is designed to start closing the mouth upon detection of an audio signal, and the closing operation is completed in synchronization with the detected output signal from said detector means after the lapse of a predetermined period of time determined by said memory means.

* * * * *